(12) United States Patent
Xiao et al.

(10) Patent No.: US 11,433,899 B2
(45) Date of Patent: Sep. 6, 2022

(54) METHOD, APPARATUS AND SYSTEM FOR DETECTING OBSTACLE COLLISION IN AUTOMATIC PARKING PATH

(71) Applicant: GUANGZHOU XIAOPENG MOTORS TECHNOLOGY CO., LTD., Guangzhou (CN)

(72) Inventors: Zhiguang Xiao, Guangzhou (CN); Jianming Lai, Guangzhou (CN); Qiang Tu, Guangzhou (CN); Shengjun Chen, Guangzhou (CN); Heng Xia, Guangzhou (CN)

(73) Assignee: GUANGZHOU XIAOPENG MOTORS TECHNOLOGY CO., LTD., Guangzhou (CN)

( * ) Notice: Subject to any disclaimer, the term of this patent is extended or adjusted under 35 U.S.C. 154(b) by 281 days.

(21) Appl. No.: 16/732,249

(22) Filed: Dec. 31, 2019

(65) Prior Publication Data
US 2020/0130696 A1 Apr. 30, 2020

Related U.S. Application Data

(63) Continuation of application No. PCT/CN2018/102812, filed on Aug. 29, 2018.

(30) Foreign Application Priority Data

Aug. 29, 2017 (CN) .......................... 201710755754.1

(51) Int. Cl.
B60W 40/02 (2006.01)
G05D 1/02 (2020.01)

(52) U.S. Cl.
CPC ........... *B60W 40/02* (2013.01); *G05D 1/0214* (2013.01); *B60W 2554/80* (2020.02); *G05D 2201/0213* (2013.01)

(58) Field of Classification Search
CPC ............. B60W 40/02; B60W 2554/80; B60W 2554/20; B60W 30/06; B60W 30/0953;
(Continued)

(56) References Cited

U.S. PATENT DOCUMENTS

2012/0303258 A1 11/2012 Pampus et al.
2016/0075329 A1* 3/2016 Tomozawa ............ B60W 10/20
701/41

FOREIGN PATENT DOCUMENTS

CN 102963358 A 3/2013
CN 104354656 A 2/2015
(Continued)

OTHER PUBLICATIONS

Vorobieva, Hélène, et al. "Automatic parallel parking in tiny spots: Path planning and control." IEEE Transactions on Intelligent Transportation Systems 16.1 (2014): 396-410. (Year: 2014).*
(Continued)

Primary Examiner — Sze-Hon Kong
Assistant Examiner — Ana D Thomas
(74) Attorney, Agent, or Firm — J.C. Patents

(57) ABSTRACT

Provided are a method, apparatus and system for detecting obstacle collision in an automatic parking path. The method includes: geometrically performing an obstacle collision detection in a circular arc path and/or an obstacle collision detection in a straight line path by using a path contour, a vehicle contour and an obstacle contour. The system includes a collision detection module for geometrically performing detection of obstacle collision in a circular arc path and/or detection of obstacle collision in a straight line path by using a path contour, a vehicle contour and an obstacle contour. The apparatus includes: a memory and a processor configured for geometrically performing detection of obstacle collision in a circular arc path and/or detection of
(Continued)

obstacle collision in a straight line path by using a path contour, a vehicle contour and an obstacle contour.

8 Claims, 10 Drawing Sheets

(58) Field of Classification Search
CPC ......... B60W 50/0097; B60W 30/0956; B60W 2554/00; G05D 1/0214; G05D 2201/0213; B62D 15/0285; G01C 21/20
See application file for complete search history.

(56) References Cited

FOREIGN PATENT DOCUMENTS

| | | |
|---|---|---|
| CN | 106114511 A | 11/2016 |
| CN | 106874551 A | 6/2017 |
| CN | 106945662 A | 7/2017 |
| CN | 107672588 A | 2/2018 |
| IT | 1138212 B | 9/1986 |
| WO | 2005/085043 A1 | 9/2005 |

OTHER PUBLICATIONS

The International Search Report of corresponding International application No. PCT/CN2018/02812, dated Nov. 16, 2018.
The Chinese Examination Report and Search Report of corresponding Chinese application No. 201710755754.1, dated Mar. 13, 2019.

\* cited by examiner

METHOD, APPARATUS AND SYSTEM FOR DETECTING OBSTACLE COLLISION IN AUTOMATIC PARKING PATH

CROSS-REFERENCES TO RELATED APPLICATIONS

This application is a continuation of International Application No. PCT/CN2018/102812, filed on Aug. 29, 2018, which claims the priority benefit of China Patent Application CN201710755754.1, filed on Aug. 29, 2017. The contents of the above identified applications are incorporated herein by reference in their entireties.

TECHNICAL FIELD

The present application relates to an automatic detection technology, and in particular, to a method, apparatus and system for detecting obstacle collision in a parking path in the process of automatic parking.

BACKGROUND

In recent years, with the continuous development of intelligent vehicles, automatic parking technologies have been widely studied and applied. The automatic parking technologies can help people to complete parking safely and reliably. It uses on-board sensors to detect an available parking space, then plans an executable path, and then automatically controls the vehicle to follow the path to complete parking. It can be seen that path planning is a key part of the automatic parking technology, and its basic requirements include: feasible path, safe and collision free, simple and efficient algorithm. Where, the safe and collision free and the simple and efficient algorithm are very important to the path planning algorithm. However, the collision detection in the commonly used path planning method for automatic parking has the problem of low detection efficiency, so it is difficult to meet the requirements of automatic parking path planning.

SUMMARY

In order to solve the above technical problem, a first purpose of the present application is to provide an efficient method for detecting obstacle collision in an automatic parking path.

A second purpose of the present application is to provide an efficient apparatus for detecting obstacle collision in an automatic parking path.

A third purpose of the present application is to provide an efficient system for detecting obstacle collision in an automatic parking path.

A first technical solution adopted in the present application is: a method for detecting obstacle collision in an automatic parking path, including the following steps:

geometrically performing an obstacle collision detection in a circular arc path and/or an obstacle collision detection in a straight line path by using a path contour, a vehicle contour and an obstacle contour;

where the path contour is a boundary contour formed by a vehicle traveling from a start point pose to an end point pose along the path, the path contour includes a circular arc path contour and/or a straight line path contour, the vehicle contour is a polygon, and the obstacle contour is a line segment.

Further, the step of geometrically performing an obstacle collision detection in a circular arc path includes the following sub-steps:

determining whether an obstacle meets an obvious non-collision condition;

determining whether the line segment of the obstacle intersects with the circular arc path contour;

determining whether the line segment of the obstacle is located in the circular arc path contour;

determining whether the line segment of the obstacle intersects with an end point vehicle contour, where the end point vehicle contour refers to a vehicle contour at the end point pose;

determining whether the line segment of the obstacle is located in the end point vehicle contour; and according to a determined result, determining whether the obstacle collides with the path.

Further, the obvious non-collision condition includes any one of the following conditions:

distances between both end points of the line segment of the obstacle and a center of a circle corresponding to the circular arc path contour are all less than a first radius, the first radius being a radius corresponding to an inside circular arc segment in the circular arc path contour;

the minimum distance from the center of the circle corresponding to the circular arc path contour to the line segment of the obstacle is greater than a second radius, the second radius being a radius corresponding to an outside circular arc segment in the circular arc path contour; and both end points of the line segment of the obstacle are within a range of a fourth central angle, the fourth central angle being a group angle of a central angle corresponding to a planned path.

Further, the step of determining whether the line segment of the obstacle intersects with the circular arc path contour includes the following sub-steps:

combining a straight line equation and a circle equation to get a single-variable quadratic equation, where the straight line equation refers to an equation of a straight line where the line segment of the obstacle is located, the circle equation includes an equation of a first circle where the inside circular arc segment in the circular arc path contour is located and an equation of a second circle where the outside circular arc segment in the circular arc path contour is located;

determining whether the single-variable quadratic equation has a real root solution, and if yes, meaning there is an intersection point between the straight line and the circles; otherwise, meaning there is no intersection point between the straight line and the circles; and when it is determined that there is an intersection point between the straight line and the circles, determining whether the intersection point is on the line segment of the obstacle and the inside or outside circular arc segment of the path contour, and if yes, meaning that the line segment of the obstacle intersects with the circular arc path contour; otherwise, meaning that the line segment of the obstacle does not intersect with the circular arc path contour.

Further, the step of determining whether the line segment of the obstacle is located in the circular arc path contour includes the following sub-steps:

determining whether the line segment of the obstacle is located in a circular ring segment of the circular arc path; and when it is determined that the line segment of the obstacle is located in the circular ring segment of the circular arc path, determining whether both end points of the line segment of the obstacle are all located in a first region, and if yes, meaning that the line segment of the obstacle is not located in the circular arc path contour; otherwise, meaning that the line segment of the obstacle is located in the circular arc path contour;

where the first region refers to a region that is within the circular ring segment of the circular arc path and does not belong to a region where the path interferes with the vehicle contour.

Further, the step of determining whether the line segment of the obstacle is located in a circular ring segment of the circular arc path includes the following sub-steps:

determining whether distances between both end points of the line segment of the obstacle and the center of the circle corresponding to the circular arc path contour are all greater than the first radius and less than the second radius, and if yes, performing a next step; otherwise, meaning that the line segment of the obstacle is not located in the circular ring segment of the circular arc path; and determining whether both end points of the line segment of the obstacle are all within a range of a fifth central angle, and if yes, performing a next step; otherwise, meaning that the line segment of the obstacle is not within the circular ring segment of the circular arc path.

Further, the step of determining whether the line segment of the obstacle intersects with an end point vehicle contour includes the following sub-steps:

taking a straight line where the line segment of the obstacle is located as a X axis, and one end of the line segment of the obstacle as a coordinate origin, to establish a plane rectangular coordinate system;

converting the end point vehicle contour to be in the plane rectangular coordinate system, so as to obtain a coordinate of an angle of the end point vehicle contour in the plane rectangular coordinate system;

determining whether there is an intersection point between edges of the end point vehicle contour and the X axis by using the obtained coordinate of the angle; and when it is determined that there is an intersection point between the end point vehicle contour and the X axis, determining whether X-coordinate of the intersection point conforms to an intersection determination criterion, and if yes, meaning that the line segment of the obstacle intersects with the end point vehicle contour; otherwise, meaning that the line segment of the obstacle does not intersect with the end point vehicle contour.

Further, the step of determining whether the line segment of the obstacle is located in the end point vehicle contour includes the following sub-steps:

by using directed line segments formed by both end points of the line segment of the obstacle and corner points of the end point vehicle contour, determining whether both end points of the line segment of the obstacle are all located in the end point vehicle contour, and if yes, meaning that the line segment of the obstacle is located in the end point vehicle contour; otherwise, meaning that the line segment of the obstacle is not located in the end point vehicle contour.

Further, the step of geometrically performing an obstacle collision detection in a straight line path includes the following sub-steps:

determining whether the line segment of the obstacle intersects with the straight line path contour;

determining whether the line segment of the obstacle is located in the straight line path contour;

determining whether the line segment of the obstacle intersects with the end point vehicle contour;

determining whether the line segment of the obstacle is located in the end point vehicle contour; and determining whether the obstacle collides with the path according to a determined result.

A second technical solution adopted in the present application is: an apparatus for detecting obstacle collision in an automatic parking path, including:

a memory for storing various programs;

a processor for loading the programs and performing the following steps:

geometrically performing an obstacle collision detection in a circular arc path and/or an obstacle collision detection in a straight line path by using a path contour, a vehicle contour and an obstacle contour;

where the path contour is a boundary contour formed by a vehicle traveling from a start point pose to an end point pose along the path, the path contour includes a circular arc path contour and/or a straight line path contour, the vehicle contour is a polygon, and the obstacle contour is a line segment.

A third technical solution adopted in the present application is: a system for detecting obstacle collision in an automatic parking path, including:

a collision detection module, configured to geometrically perform an obstacle collision detection in a circular arc path and/or an obstacle collision detection in a straight line path by using a path contour, a vehicle contour and an obstacle contour;

where the path contour is a boundary contour formed by a vehicle traveling from a start point pose to an end point pose along the path, the path contour includes a circular arc path contour and/or a straight line path contour, the vehicle contour is a polygon, and the obstacle contour is a line segment.

The method, apparatus and system of the present application have the following beneficial effects: the present application uses a line segment to express an obstacle, and uses a straight line and a circular arc to express a path, which is convenient for data calculation and storage and the construction of a mathematical model, and easy to realize; uses a layered determination process of a circular arc path and a straight line path to realize a path obstacle detection, which can significantly improve the operation efficiency. In addition, the present application method uses the circular arc and the straight line to construct the path contour of vehicle traveling, and thus discrete traversal can be avoided to improve the calculation efficiency, and furthermore the path obstacle collision detection is simplified as the interference problem between a circular arcs, a polygon and a line segment, which makes the path obstacle collision detection algorithm simpler, not only reducing the algorithm complexity and improving the calculation efficiency, but also reducing the requirements of operating processor, and reducing the cost.

DESCRIPTION OF EMBODIMENTS

Embodiment 1

Figure 1:
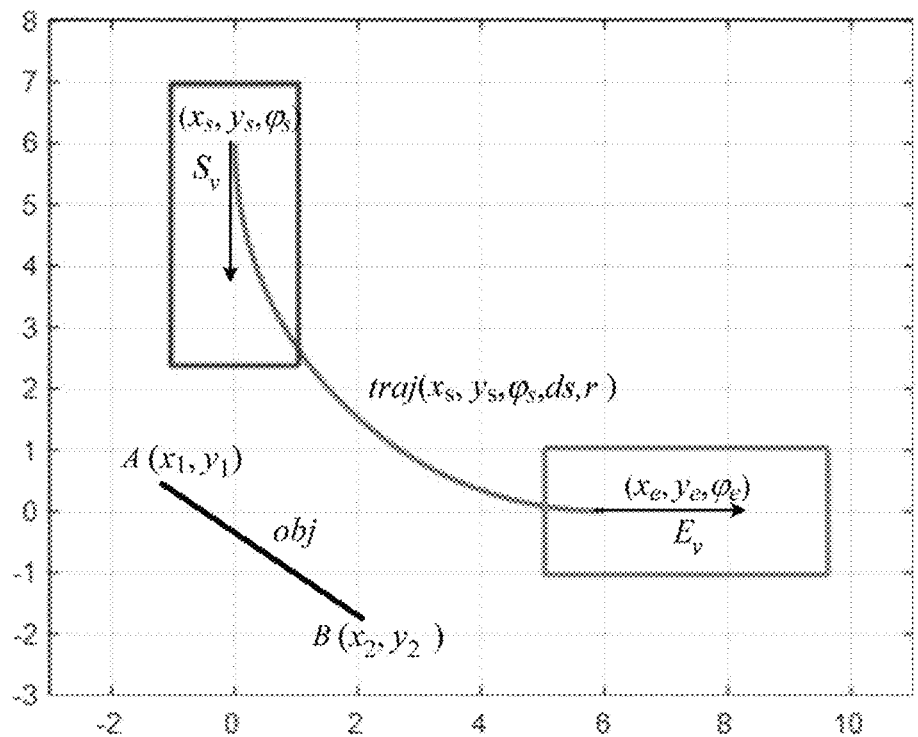
FIG. 1 is a schematic diagram of a path, an obstacles and a vehicle.

A method for detecting obstacle collision in an automatic parking path includes the following steps:

geometrically performing an obstacle collision detection in a circular arc path and/or an obstacle collision detection in a straight line path by using a path contour, a vehicle contour and an obstacle contour;

where the path contour is a boundary contour formed by a vehicle traveling along the path from a start point pose to an end point pose, the path contour includes a circular arc path contour and/or a straight line path contour, the vehicle contour is a polygon, and the obstacle contour is a line segment.

Further, as a preferred embodiment of the method of the present application, the step of geometrically performing an obstacle collision detection in a circular arc path and/or an obstacle collision detection in a straight line path by using a path contour, a vehicle contour and an obstacle contour includes the following sub-steps:

determining whether an obstacle meets an obvious non-collision condition;

determining whether the line segment of the obstacle intersects with the circular arc path contour;

determining whether the line segment of the obstacle is located in the circular arc path contour;

determining whether the line segment of the obstacle intersects with an end point vehicle contour, where the end point vehicle contour refers to a vehicle contour at an end point pose;

determining whether the line segment of the obstacle is located in the end point vehicle contour; and according to a determined result, determining whether the obstacle collides with the path.

Further, as a preferred embodiment of the method of the present application, the obvious non-collision condition includes any one of the following conditions:

distances between both end points of the line segment of the obstacle and a center of a circle corresponding to the circular arc path contour are all less than a first radius, the first radius being a radius corresponding to an inside circular arc segment in the circular arc path contour;

the minimum distance from the center of the circle corresponding to the circular arc path contour to the line segment of the obstacle is greater than a second radius, the second radius being a radius corresponding to an outside circular arc segment in the circular arc path contour; and both end points of the line segment of the obstacle are within a range of a fourth central angle, the fourth central angle being a group angle of the central angle corresponding to a planned path.

Further, as a preferred embodiment of the method of the present application, the step of determining whether the line segment of the obstacle intersects with the circular arc path contour includes the following sub-steps:

combining a straight line equation and a circle equation to get a single-variable quadratic equation, where the straight line equation refers to a straight line equation where the line segment of the obstacle is located, the circle equation includes a first circle equation where the inside circular arc segment in the circular arc path contour is located and a second circle equation where the outside circular arc segment in the circular arc path contour is located;

determining whether the single-variable quadratic equation has a real root solution, and if yes, it meaning there is an intersection point between the straight line and the circle; otherwise, it meaning there is no intersection point between the straight line and the circle; and when it is determined that there is an intersection point between the straight line and the circle, determining whether the intersection point is on the line segment of the obstacle and the circular arc segment of the path contour, and if yes, meaning that the line segment of the obstacle intersects with the circular arc path contour; otherwise, meaning that the line segment of the obstacle does not intersect with the circular arc path contour.

Further, as a preferred embodiment of the method of the present application, the step of determining whether the line segment of the obstacle is located in the circular arc path contour includes the following sub-steps:

determining whether the line segment of the obstacle is located in a circular ring segment of the circular arc path; and when it is determined that the line segment of the obstacle is located in the circular ring segment of the circular arc path, determining whether both end points of the line segment of the obstacle are all located in a first region, and if yes, meaning that the line segment of the obstacle is not located in the circular arc path contour; otherwise, meaning that the line segment of the obstacle is located in the circular arc path contour;

where the first region refers to a region that is within the circular ring segment of the circular arc path and does not belong to a region where the path interferes with the vehicle contour.

Further, as a preferred embodiment of the method of the present application, the step of determining whether the line segment of the obstacle is located in a circular ring segment of the circular arc path includes the following sub-steps:

determining whether the distances between both end points of the line segment of the obstacle and the center of the circle corresponding to the circular arc path contour are all greater than the first radius and less than the second radius, and if yes, performing a next step; otherwise, meaning that the line segment of the obstacle is not located in the circular ring segment of the circular arc path; and determining whether both end points of the line segment of the obstacle are all within a range of a fifth central angle, and if yes, performing a next step; otherwise, meaning that the line segment of the obstacle is not within the circular ring segment of the circular arc path.

Further, as a preferred embodiment of the method of the present application, the step of determining whether the line segment of the obstacle intersects with an end point vehicle contour includes the following sub-steps:

taking a straight line where the line segment of the obstacle is located as X axis, and one end of the line segment of the obstacle as a coordinate origin, to establish a plane rectangular coordinate system;

converting the end point vehicle contour to be in the plane rectangular coordinate system, so as to obtain a coordinate of an angle of the end point vehicle contour in the plane rectangular coordinate system;

determining whether there is an intersection point between edges of the end point vehicle contour and the X axis by using the obtained coordinate of the angle; and when it is determined that there is an intersection point between the end point vehicle contour and the X axis, determining whether X-coordinate of the intersection point conforms to an intersection determination criterion, and if yes, meaning that the line segment of the obstacle intersects with the end point vehicle contour; otherwise, meaning that the line segment of the obstacle does not intersect with the end point vehicle contour.

Further, as a preferred embodiment of the method of the present application, the step of determining whether the line segment of the obstacle is located in the end point vehicle contour includes the following sub-steps:

by using directed line segments formed by both end points of the line segment of the obstacle and corner points of the end point vehicle contour, determining whether both end points of the line segment of the obstacle are all located in the end point vehicle contour, and if yes, meaning that the line segment of the obstacle is located in the end point vehicle contour; otherwise, meaning that the line segment of the obstacle is not located in the end point vehicle contour.

Further, as a preferred embodiment of the method of the present application, the step of geometrically performing an obstacle collision detection in a straight line path includes the following sub-steps:

determining whether the line segment of the obstacle intersects with the straight line path contour;

determining whether the line segment of the obstacle is located in the straight line path contour;

determining whether the line segment of the obstacle intersects with the end point vehicle contour;

determining whether the line segment of the obstacle is located in the end point vehicle contour; and determining whether the obstacle collides with the path according to a determined result.

The contents of the above method embodiment are applicable to the following system embodiments and device embodiments.

Embodiment 2

An apparatus of combining software and hardware corresponding to the above method, i.e., an apparatus for detecting obstacle collision in an automatic parking path, includes:

a memory for storing various programs;

a processor for loading the programs and performing the following steps:

geometrically performing an obstacle collision detection in a circular arc path and/or an obstacle collision detection in a straight line path by using a path contour, a vehicle contour and an obstacle contour;

where the path contour is a boundary contour formed by a vehicle traveling along the path from a start point pose to an end point pose, the path contour includes a circular arc path contour and/or a straight line path contour, the vehicle contour is a polygon, and the obstacle contour is a line segment.

Embodiment 3

A soft system corresponding to the above system, i.e., a system for detecting obstacle collision in an automatic parking path, includes:

a collision detection module, configured to geometrically perform an obstacle collision detection in a circular arc path and/or an obstacle collision detection in a straight line path by using a path contour, a vehicle contour and an obstacle contour;

where the path contour is a boundary contour formed by a vehicle traveling along the path from a start point pose to an end point pose, the path contour includes a circular arc path contour and/or a straight line path contour, the vehicle contour is a polygon, and the obstacle contour is a line segment.

Embodiment 4

The above Embodiments 1-3 are further described in combination with the contents of the present embodiment (that is, the contents of the present embodiment are applicable to the above Embodiments 1-3).

The present application relates to a method for detecting obstacle collision in an automatic parking path, which is applicable to the parking path planning technology. In the present embodiment, the specific steps are as follows.

A first step S1: representations of path, vehicle and obstacle.

As shown in FIG. 1, it is a schematic diagram of path obstacles. It can be seen that any one of paths traj can be expressed by five parameters $(x_z, y_z, \varphi_z, ds, \gamma)$. Where $(x_s, y_s, \varphi_s)$ is a vehicle start point pose corresponding to the path, $x_z$ and $y_z$ are expressed as X coordinate and Y coordinate of the vehicle start point pose respectively, $\varphi_s$ is a heading angle of the vehicle start point pose; ds is a length of the path, and when ds is positive, it means the vehicle moves forward; when it is negative, it means the vehicle moves backward; r is a radius corresponding to the path, and when r is positive, it means the vehicle turns left; when it is negative, it means the vehicle turns right, and when r=0, it means the vehicle moves in a straight line.

In this embodiment, any one of obstacles obj is represented by a line segment, which is described by two end points $A(x_1, y_1)$ and $B(x_2, y_2)$, that is, the obstacle contour is a line segment, that is, the line segment for representing the obstacle is an obstacle line segment; in the collision detection process, the vehicle contour is optimally simplified as a rectangle, and its specific parameters include three parameters as follows: vehicle length len, vehicle width width and rear suspension length h; the concept of path contour is used to detect the obstacle collision, that is, the boundary contour formed by the vehicle traveling from the start point pose to the end point pose along the path is regarded as a whole path contour, and the path obstacle collision detection is performed by a geometric method. Specifically, the above boundary contour can be simplified as a rectangle and a circular arc segment, that is, the path contour includes a circular arc path contour and/or a straight line path contour. It can be seen that the path obstacle collision detection problem of the present application is simplified as an interference problem (intersection problem) among the rectangle, the arc-segment and the line segment.

Preferably, in order for the vehicle to travel safely on the planned path, it is necessary to keep a certain distance between the outer contour of the vehicle and the obstacle. Therefore, during the collision detection, the shape parameters of the vehicle are subjected to expansion swell to a certain extent to ensure that there is a certain safe distance between a real vehicle and the obstacle. Therefore, in this embodiment, the vehicle contour is preferably represented by four parameters, len, width, h and swell.

In this embodiment, according to the value of r, the obstacle collision detection is divided into circular arc-path obstacle collision detection and straight line-path obstacle collision detection, which use different detection methods.

Figure 2:
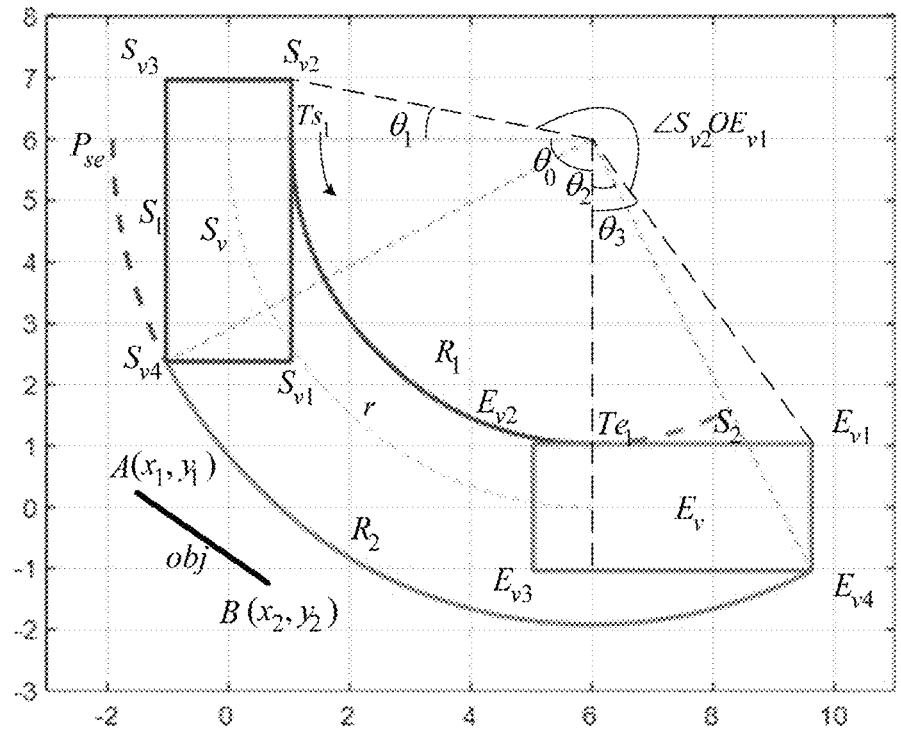
FIG. 2 is a schematic diagram of a first parameter of an obstacle collision detection in a circular arc path.
Figure 3:
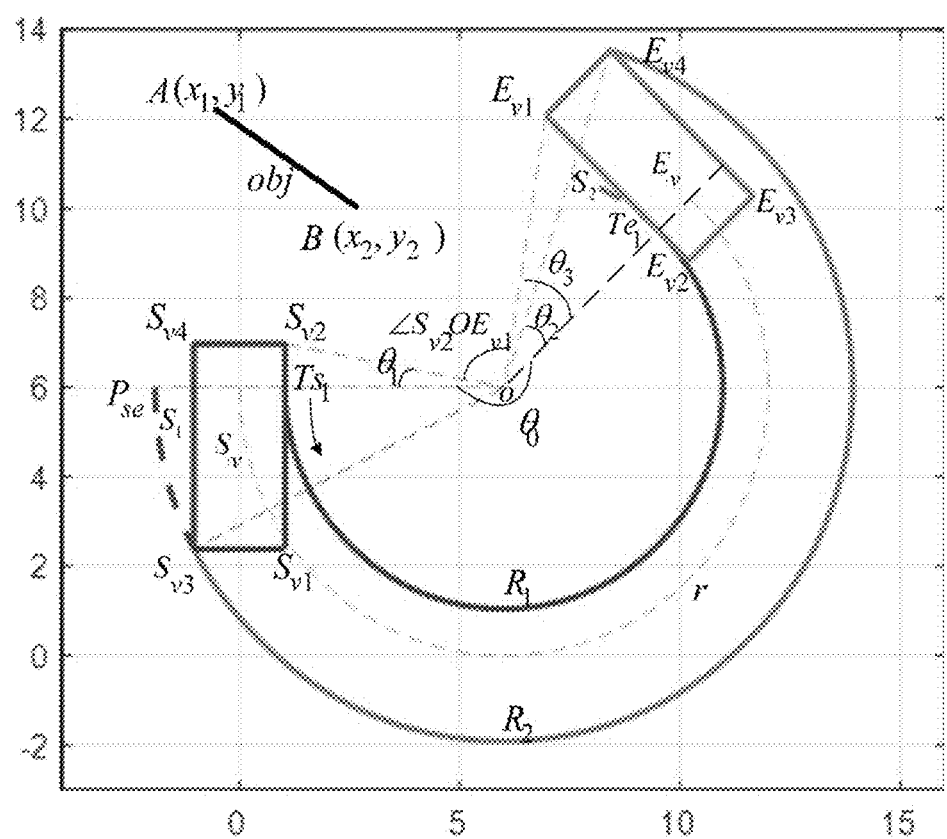
FIG. 3 is a schematic diagram of a second parameter of an obstacle collision detection in a circular arc path.

In addition, to ensure the completeness of the path obstacle collision detection method, as shown in FIG. 2 and FIG. 3, in the process of the circular arc-path obstacle collision detection, the central angle of each path in the engineering application is set to meet the condition as follows:

$$\theta_0 + \theta_1 + \theta_3 = \left|\frac{ds}{r}\right| + ac\ tan\left[\frac{(len-h)}{|r|}\right] + ac\ tan\left[\frac{h}{|r|}\right] \le 2 \cdot \pi.$$

Where $\theta(\theta=\theta_0+\theta_1+\theta_2)$ represents a central angle corresponding to a planned parking path, referred to as the central angle corresponding to the planned path; $\theta_0$ (first central angle) is a central angle corresponding to an inside path generated by traveling of the inside rear wheel (left rear wheel) of the vehicle when the vehicle travels from the start point pose to the end point pose along the path, that is, the first central angle is formed by a center of a circle, inside rear wheel point $Ts_1$ of a start point vehicle contour $S_v$, and inside rear wheel point $Te_1$ of an end point vehicle contour $E_v$, and the central angle is the turning angle of the vehicle; $\theta_1$ (second central angle) is a central angle corresponding to a distance between lower left corner point $S_{v2}$ and the inside rear wheel point $Ts_1$ of the start point vehicle contour $S_v$, i.e. the second central angle is formed by a center of a circle, the lower left corner point $S_{v2}$ of the start point vehicle contour $S_v$ and the inside rear wheel point $Ts_1$ of the start point vehicle contour $S_v$; $\theta_3$ (third central angle) is a central angle corresponding to a distance between upper left corner point $E_{v1}$ and the inside rear wheel point $Te_1$ of the end point vehicle contour $E_v$, i.e. the third central angle is formed by a center of a circle, the inside rear wheel point $Te_1$ of the end point vehicle contour $E_v$ and upper left corner point $E_{v1}$ of the end point vehicle contour $E_v$.

For the central angles, they correspond to a fixed and the same center of a circle, and the center of the circle refers to a center of a circle corresponding to the planned parking path; for the start point vehicle contour $S_v$, it refers to a vehicle contour at the start point pose; for the end point vehicle contour $E_v$, it refers to a vehicle contour at the end point pose; for the inside path generated by traveling of the inside rear wheel of the vehicle when the vehicle travels from the start point pose to the end point pose along the path, when the path contour is a circular arc path contour, the inside path is essentially a circular arc segment, that is, an inside circular arc segment; when the path contour is a straight line path contour, the inside path is essentially a line segment; when the vehicle travels from the start point pose to the end point pose along the path, a path passed by the upper right corner point of the vehicle contour is regarded as an outside path, and when the path contour is a circular arc path contour, the outside path is essentially a circular arc segment, that is, an outside circular arc segment. When the path contour is a straight line path contour, the outside path is essentially a line segment.

Next, obstacle collision detection processes in the circular arc path and straight line path will be described in detail.

A second step S2: an obstacle collision detection process in the circular arc path and an obstacle collision detection process in the straight line path.

Figure 4:
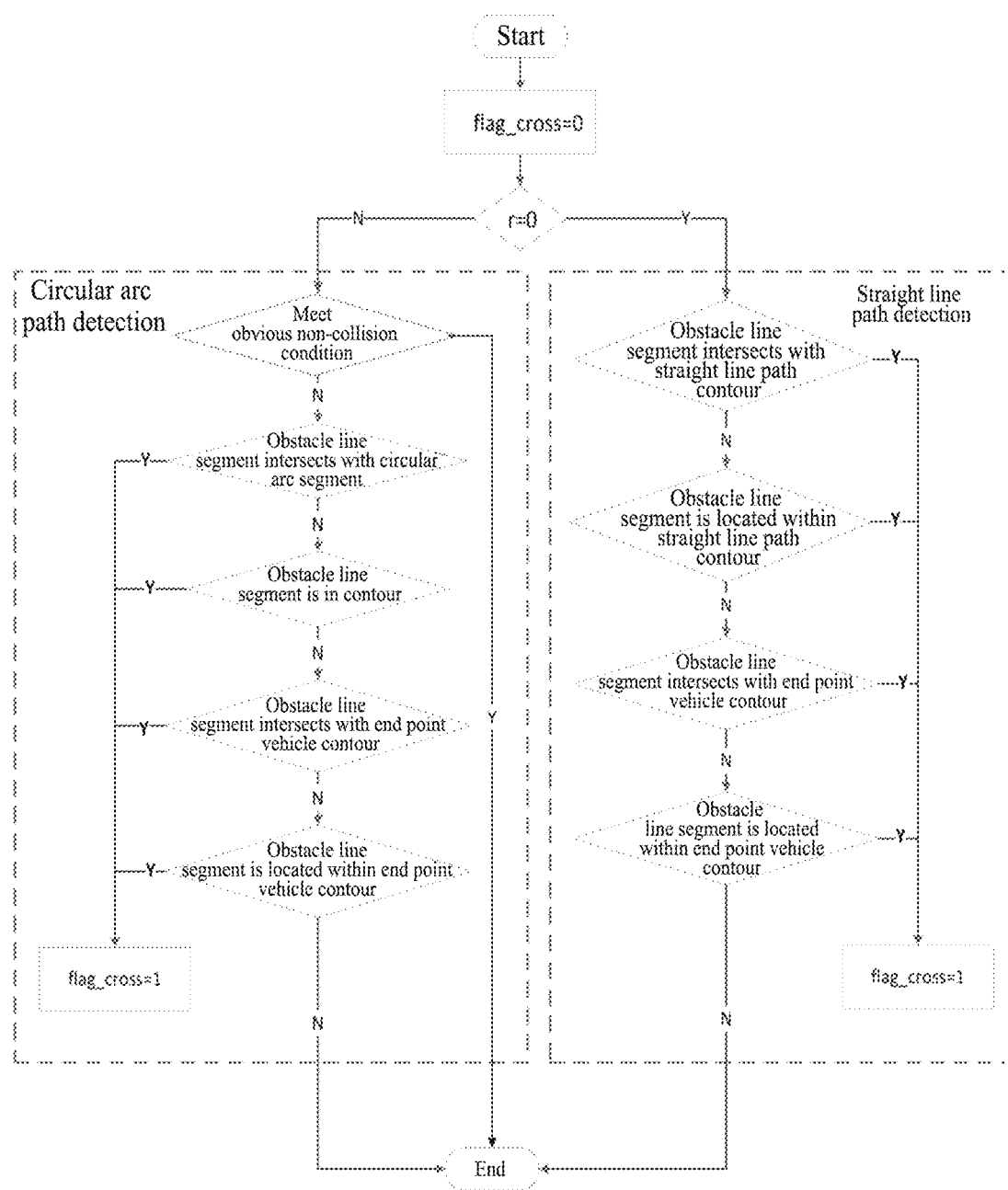
FIG. 4 is a schematic flow chart of specific steps of a method for detecting obstacle collision in an automatic parking path according to the present application.

It can be known from the above, for steps of the obstacle collision detection process in the automatic parking path of the present application, as shown in FIG. 4, they specifically include:

according to the radius r corresponding to the planned parking path, determining whether to perform an obstacle collision detection in a circular arc path or an obstacle collision detection in a straight line path;

when it is determined that the obstacle collision detection in a circular arc path is needed to be performed, that is, r is not equal to 0, geometrically performing the obstacle collision detection process in the circular arc path using the path contour, the vehicle contour and the obstacle contour;

when it is determined that the obstacle collision detection in a straight line path is needed, that is, r is equal to 0, geometrically performing the obstacle collision detection process in the straight line path using the path contour, the vehicle contour and the obstacle contour;

when it is detected that the obstacle collides with the path, collision mark flag_cross=1; and when it is detected that the obstacle does not collide with the path, the collision flag flag_cross=0.

I. Obstacle Collision Detection in Circular Arc Path

For the obstacle collision detection in the circular arc path, its parameter schematic diagram is shown in FIG. 2 and FIG. 3, and path and obstacle parameters needed in the process of a path obstacle collision detection are given specifically.

① Determining whether the obstacle meets an obvious non-collision condition, where the obvious non-collision condition includes:

condition 1: distances between two end points A and B of the obstacle line segment and the center O of the circle corresponding to the circular arc path contour are smaller than a first radius R1, where the first radius R1 is a radius corresponding to the inside circular arc segment in the circular arc path contour;

condition 2: the minimum distance from the center O of the circle corresponding to the circular arc path contour to the obstacle line segment AB is greater than the second radius R2, where the second radius R2 is a radius corresponding to the outside circular arc segment of the circular arc path contour; the minimum distance refers to the smaller of the distances from the center O to both end points A and B of the obstacle line segment;

condition 3: both end points A and B of the obstacle line segment are located within a range of a fourth central angle $\angle S_{v2}OE_{v1}$, the fourth central angle is a group angle of a central angle θ corresponding to the planned path, and the group angle refers to an angle that is equal to 360 degrees when the central angle θ is added.

When the obstacle meets any one of the above three conditions, it meets the obvious non-collision condition, then a subsequent collision detection process is not needed. That is to say, when the obstacle meets the obvious non-collision condition, it is determined that the obstacle does not collide with the path, and the collision detection is ended, and the subsequent collision detection process is not needed.

For the above condition 3, this embodiment uses vector cross product to determine whether two end points A and B of the obstacle line segment are both located in the range of $\angle S_{v2}OE_{v1}$. In other words, the step of determining whether the obstacle meets the obvious non-collision condition includes a sub-step of using vector cross product to determine whether the two end points A and B of the obstacle line segment are both located in the range of $\angle S_{v2}OE_{v1}$. The sub-step includes specific calculation steps as follows:

calculate a vector product (as a first vector product) of two vectors $\overrightarrow{OA}$ and $\overrightarrow{OE_{v1}}$, i.e., calculate $[X_1, Y_1, Z_1]=\overrightarrow{OA}\times\overrightarrow{OE_{v1}}$;

calculate a vector product (as a second vector product) of two vectors OA and $\overrightarrow{OS_{v2}}$, i.e., calculate $[X_2, Y_2, Z_2]=\overrightarrow{OA}\times\overrightarrow{OS_{v2}}$;

calculate a vector product (as a third vector product) of two vectors $\overrightarrow{OB}$ and $\overrightarrow{OE_{v1}}$, i.e., calculate $[X_3, Y_3, Z_3]=\overrightarrow{OB}\times\overrightarrow{OE_{v1}}$; and calculate a vector product (as a fourth vector product) of two vectors OB and $\overrightarrow{OS_{v2}}$, i.e., calculate $[X_4, Y_4, Z_4]=\overrightarrow{OB}\times\overrightarrow{OS_{v2}}$;

when $360°\geq\angle S_{v2}OE_{v1}\geq 180°$, as shown in FIG. 2, if a component Z in the vector product meets a first sub condition ($Z_1<0$ and $Z_3<0$) or a second sub condition ($Z_2>0$ and $Z_4>0$), then it is determined that the obstacle is located in the range of $\angle S_{v2}OE_{v1}$; and When $\angle S_{v2}OE_{1v}<180°$, as shown in FIG. 3, if the component Z in the vector product meets a third sub-condition ($Z_1<0$ and $Z_3<0$) and a fourth sub-condition ($Z_2>0$ and $Z_4>0$), then it is determined that the obstacle is located within the range of $\angle S_{v2}OE_{v1}$.

Figure 5:
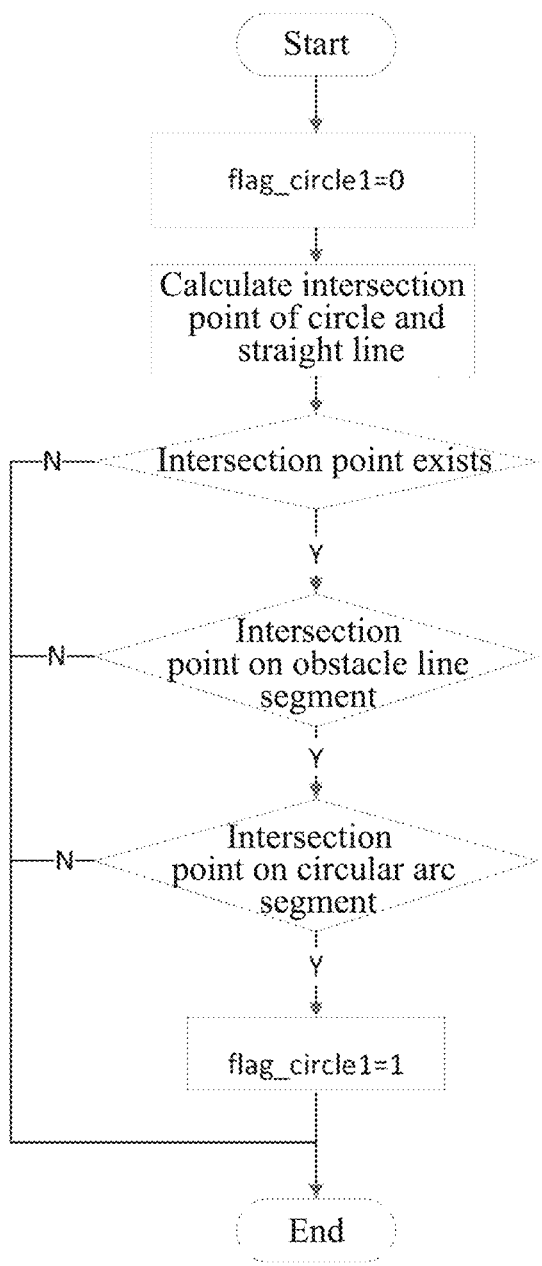
FIG. 5 is a schematic flow chart for determining whether a line segment of an obstacle intersects with a circular arc path contour.

② Determining whether the obstacle line segment intersects with the circular arc path contour, as shown in FIG. 5. This step includes the following sub-steps.

S201, Calculating an intersection point of a circle and a straight line, that is, solve a common real number solution between the straight line equation and the circle equation.

The straight line refers to a straight line where the obstacle line segment is located, that is, the straight line equation refers to a straight line equation corresponding to the straight line where the obstacle line segment is located: $Ax+By+C=0$; where, $A=y_2-y_1$; $B=x_1-x_2$; $C=y_1\cdot X_2-y_2\cdot x_1$;

the circle includes a first circle where the inside circular arc segment in the circular arc path contour is located, and a second circle where the outside circular arc segment in the circular arc path contour is located, that is, the circle equation includes a first circle equation (inside circle equation) corresponding to the circle (the first circle) where the inside circular arc segment in the circular arc path contour is located, and the second circle equation (outside circle equation) corresponding to the circle (the second circle) where the outside circular arc segment in the circular arc path contour is located, where:

the first circle equation is: $x^2+y^2+D_1x+E_1y+F_1=0$; at this time, $D_1=-2x_c$, $E_1=-2y_c$, $F_1=x_c^2+y_c^2-R_1^2$;

the second circle equation is: $x^2+y^2+D_2x+E_2y+F_2=0$; at this time, $D_2=-2x_c$, $E_2=-2y_c$, $F_2=x_c^2+y_c^2-R_2^2$;

$(x_c, y_c)$ is the coordinate of the center O of the circle.

The above step S201 specifically includes the following sub-steps:

S2011, Combining the straight line equation and the circle equation to get a single-variable quadratic equation, and then determining whether the single-variable quadratic equation has a real root solution. If it is yes, it means there is an intersection point between the straight line and the circle; otherwise, it means there is no intersection point between the straight line and the circle. A specific implementation of this step is as follows:

(1) when $A\neq 0$, combine the straight line equation and the circle equation to get $ay^2+by+c=0$, where, $$a = 1 + \frac{B^2}{A^2}, b = \frac{2BC}{A^2} + E - \frac{DB}{A}, c = \frac{C^2}{A^2} - \frac{CD}{A} + F;$$

determining $\Delta=b^2-4ac$, if $\Delta\geq 0$, then the above quadratic equation has a real root, that is, there is an intersection point between the circle and the straight line, and at this time, coordinates of the intersection point are:

$$x_{p1,p2} = \frac{-C - By_{1,2}}{A}, y_{p1,p2} = \frac{-b \pm \sqrt{\Delta}}{2a};$$

if $\Delta<0$, then the above quadratic equation has no real root, that is, there is no intersection point between the circle and the straight line;

(2) when $B\neq 0$, combine the straight line equation and the circle equation to get $ax^2+bx+c=0$, where, $$a = 1 + \frac{A^2}{B^2}, b = \frac{2AC}{B^2} + D - \frac{AE}{B}, c = \frac{C^2}{B^2} - \frac{CE}{B} + F;$$

determining $\Delta=b^2-4ac$, if $\Delta\geq 0$, then the above quadratic equation has a real root, that is, there is an intersection point between the circle and the straight line, and at this time, coordinates of the intersection point are:

$$x_{p1,p2} = \frac{-b \pm \sqrt{\Delta}}{2a}, y_{p1,p2} = \frac{-C - A \cdot x_{1,2}}{B};$$

if $\Delta<0$, then the above quadratic equation has no real root, that is, there is no intersection point between the circle and the straight line.

S202, When it is determined that there is an intersection point between the straight line and the circle, determining whether the intersection point is on the obstacle line segment and the circular arc segment of the path contour. If it is yes, it means that the obstacle line segment intersects with the circular arc path contour. Otherwise, it means that the obstacle line segment does not intersect with the circular arc path contour.

(1) Determining whether the intersection point is on the obstacle line segment.

Figure 6:
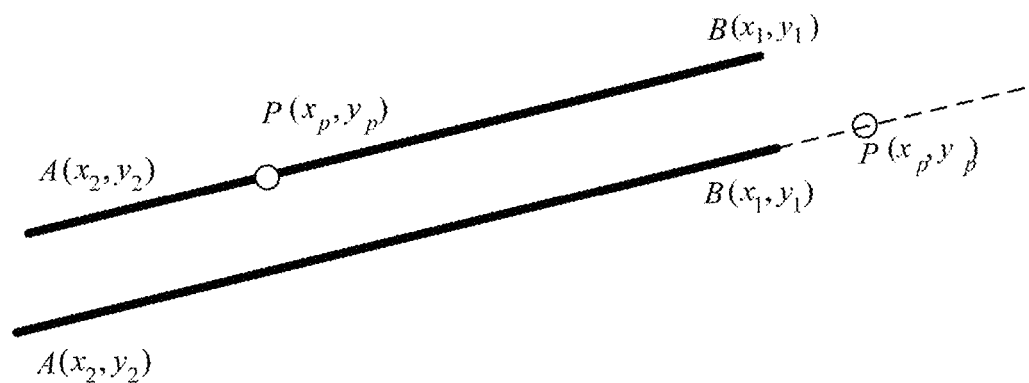
FIG. 6 is a schematic diagram for determining whether an intersection point is on the line segment.

This determination is to determine whether the intersection point P is on the obstacle line segment. First, it can be ensured that the intersection point P is definitely on the straight line. As shown in FIG. 6, when the intersection point P is on the obstacle line segment AB, it meets: $\overrightarrow{PA} \cdot \overrightarrow{PB} < 0$; otherwise, the intersection point P is on an extension line of the obstacle line segment AB. In other words, determining whether the dot product $\overrightarrow{PA} \cdot \overrightarrow{PB}$ of the two vectors is less than 0, and if it is yes, it means that the calculated intersection point P is on the obstacle line segment AB; otherwise, it means that the calculated intersection point P is on the extension line of the obstacle line segment AB, that is, there is no interference (no intersection) between the obstacle line segment and the circular arc path contour.

(2) Determining whether the intersection point is on the circular arc segment (including the inside circular arc segment and the outside circular arc segment) of the path contour.

Figure 7:
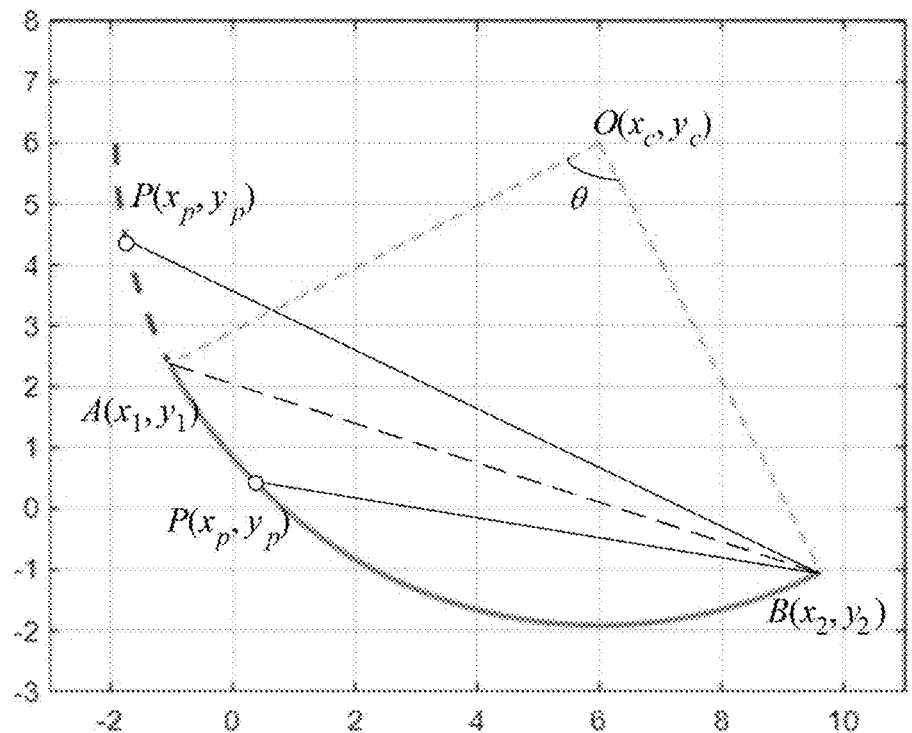
FIG. 7 is a first determination schematic diagram of whether the intersection point is on a circular arc segment.

Case 1 (as shown in FIG. 7): $\theta < \pi$ (here, $\theta$ represents degrees of the central angle corresponding to the inside/outside circular arc segment in the circular arc path contour). If the calculated intersection point P and the center O of the circle are located on both sides of a first line segment AB respectively (here, the first line segment AB refers to a line segment composed of two end points of the circular arc segment), then the intersection point P is located on the circular arc segment, that is, an interference (intersection) occurs between the obstacle line segment and the circular arc path contour; otherwise, it means that the calculated intersection point P is located on the extension line of the circular arc segment, that is, no interference (no intersection) occurs between the obstacle line segment and the circular arc path contour.

Figure 8:
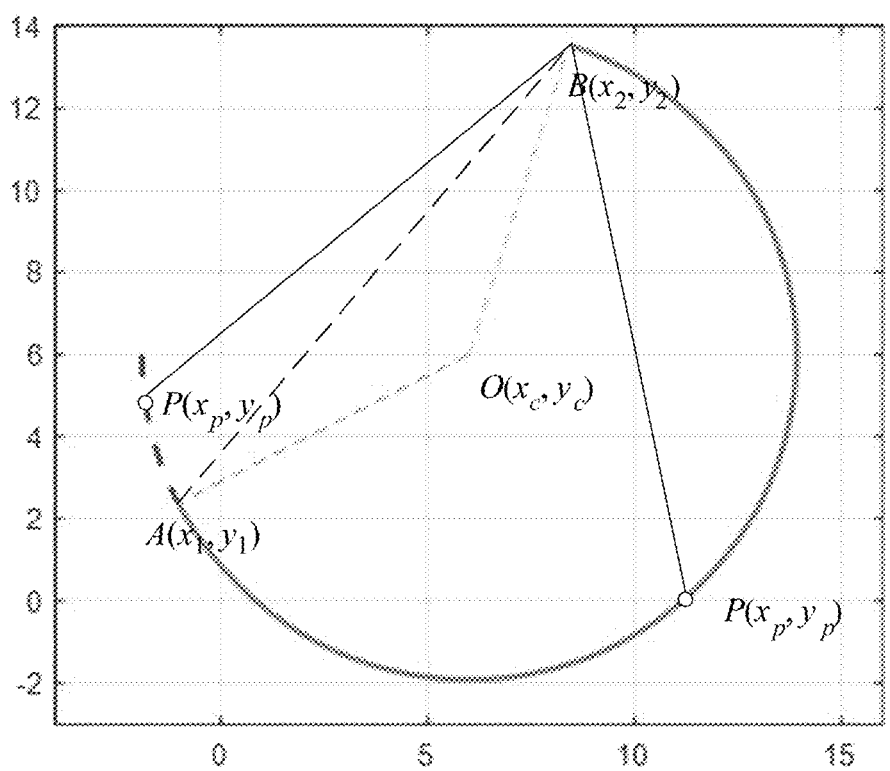
FIG. 8 is a second determination schematic diagram of whether the intersection point is on the circular arc segment.

Case 2 (as shown in FIG. 8): $\theta \geq \pi$ (here, $\theta$ represents degrees of the central angle corresponding to the inside/outside circular arc segment in the circular arc path contour). If the calculated intersection point P and the center O of the circle are located on the same side of the first line segment AB (here, the first line segment AB refers to a line segment composed of two end points of the circular arc segment), then the intersection point P is located on the circular arc segment, that is, an interference (intersection) occurs between the obstacle line segment and the circular arc path contour; otherwise, it means that the calculated intersection point P is located on the extension line of the circular arc segment, that is, no interference (no intersection) occurs between the obstacle line segment and the circular arc path contour.

For the determination that the intersection point P and the center O of the circle are on the same side of the first line segment AB, it is realized by determining component Z of cross product result of the vectors is positive or negative, that is to say, this embodiment determines whether the intersection point P and the center O are on the same side of the first line segment AB by positive or negative of the component Z of cross product result of the vectors, and this step specifically includes:

for the above case 1:

calculating a vector product (as a fifth vector product) of the two vectors $\overrightarrow{BA}$ and $\overrightarrow{BP}$, i.e. calculating $[X_5, Y_5, Z_5] = \overrightarrow{BA} \times \overrightarrow{BP}$;

calculating a vector product (as a sixth vector product) of the two vectors $\overrightarrow{BA}$ and $\overrightarrow{BO}$, i.e. calculating $[X_6, Y_6, Z_6] = \overrightarrow{BA} \times \overrightarrow{BO}$;

determining whether a result of multiplying the component Z in the fifth vector product by the component Z in the sixth vector product is less than or equal to 0, that is, determining whether $Z_5 \cdot Z_6 \leq 0$ is valid, and if it is yes, then the intersection point P and the center O are not on the same side of the first line segment AB, that is, at this time, the intersection point P is on the circular arc segment; otherwise, the intersection point P is not on the circular arc segment;

for the above case 2:

in the same way, when it is determined that $Z_5 \cdot Z_6 \leq 0$ is valid, the intersection point P and the center O are not on the same side of the first line segment AB, that is, at this time, the intersection point P is not on the circular arc segment; otherwise, the intersection point P is on the circular arc segment.

③ Determining whether the obstacle line segment is located in the circular arc path contour.

S301, Determining whether the obstacle line segment is located in a circular ring segment of the circular arc path.

Figure 10:
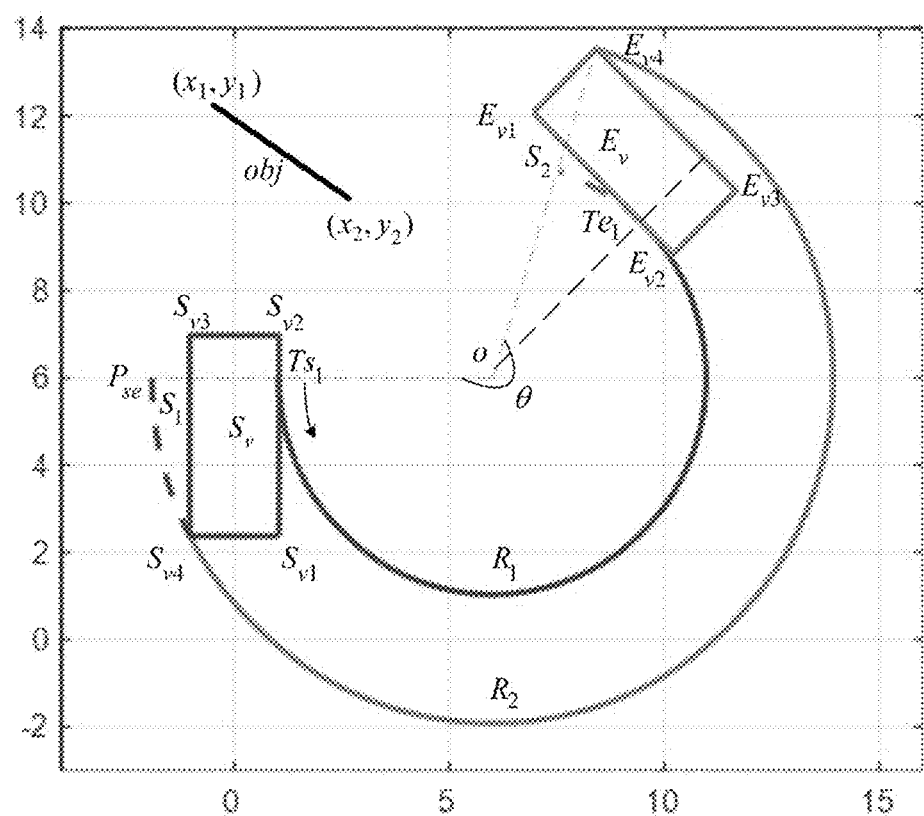
FIG. 10 is a parameter schematic diagram for determining whether a line segment of an obstacle is located in the circular arc path contour.

The circular ring segment of the circular arc path, as shown in FIG. 10, refers to a sector ring corresponding to the fifth central angle $\theta$, that is to say, the circular ring segment is a part of the circle cut out by a sector corresponding to the fifth central angle, where the fifth central angle $\theta$ refers to a central angle formed by the center O of the circle, the inside rear wheel point $Ts_1$ of the start point vehicle contour $S_v$, and the upper right corner point $E_{v4}$ of the end point vehicle contour $E_v$, and a path is included within a range of the fifth central angle $\theta$; the circular ring is obtained by subtracting the first circle from the second circle. That is to say, for the circular ring segment, it is obtained by cutting the circular ring via a second line segment and a third line segment, and an arc line segment of the circular ring segment covers the inside circular arc segment and the outside circular arc segment of the path contour; where the second line segment is formed by a second end point $P_{se}$ and the inside rear wheel point $Ts_1$ of the start point vehicle contour $S_v$, and the second end point $P_{se}$ refers to an intersection point between an extension line of a line connecting the point $Ts_1$ with the center O and the second circle; the third line segment is formed by a third end point and the upper right corner point $E_{v4}$ of the end point vehicle contour $E_v$, and the third end point refers to an intersection point between a line connecting the point $E_{v4}$ with the center O and the first circle.

Figure 9:
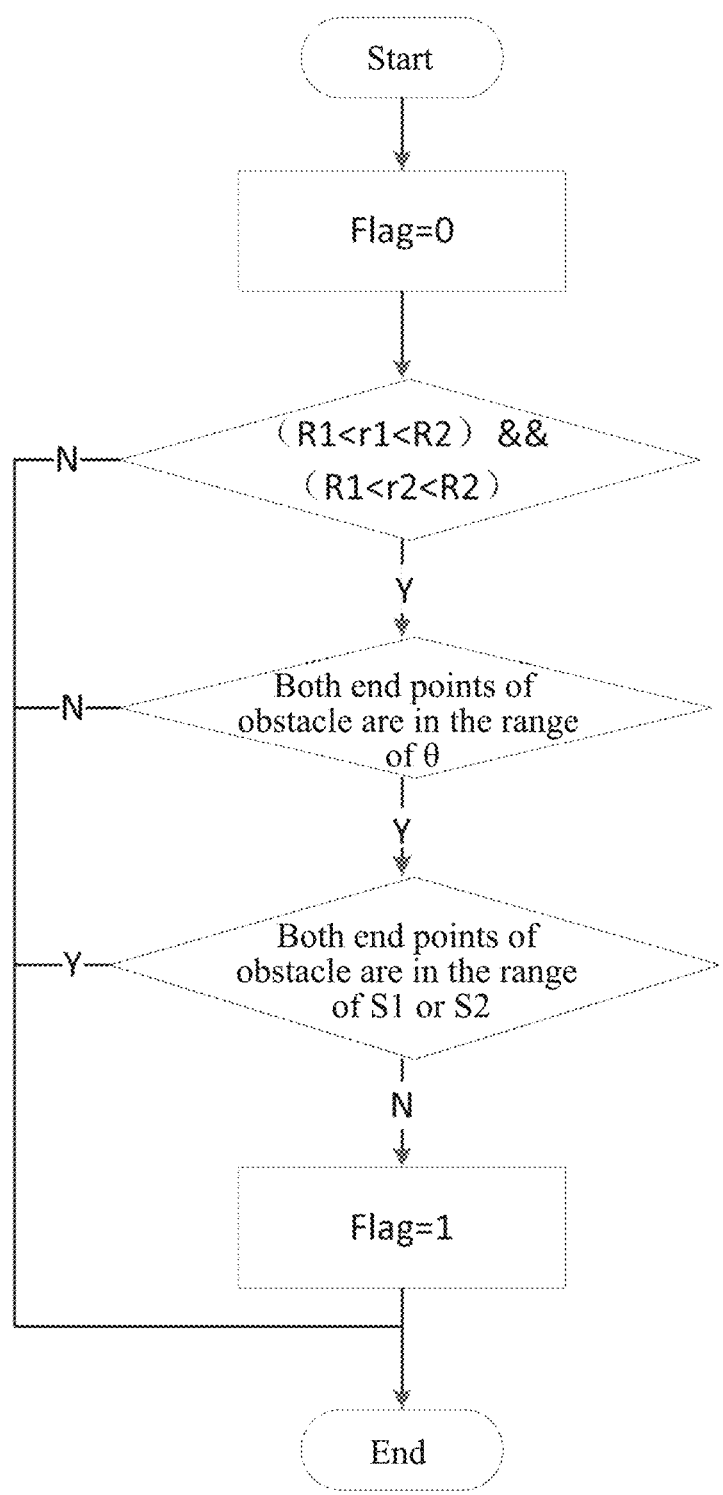
FIG. 9 is a schematic flow chart for determining whether a line segment of an obstacle is located in the circular arc path contour.

As shown in FIG. 9 and FIG. 10, step S301 specifically includes the following sub-steps:

S3011, Determining whether distances between both ends A and B of the obstacle line segment and the center O, r1 and r2, are greater than the first radius R1 and less than the second radius R2. If yes, perform a next step; otherwise, it means that the obstacle line segment is not located in the circular ring segment of the circular arc path;

S3012, Determining whether both ends A and B of the obstacle line segment are within the range of the fifth central angle $\theta$. If it is yes, it means that the obstacle line segment is located in the circular ring segment of the circular arc path, and at this time, a next step is performed; otherwise, it means that the obstacle line segment is not located in the circular ring segment of the circular arc path.

Figure 11:
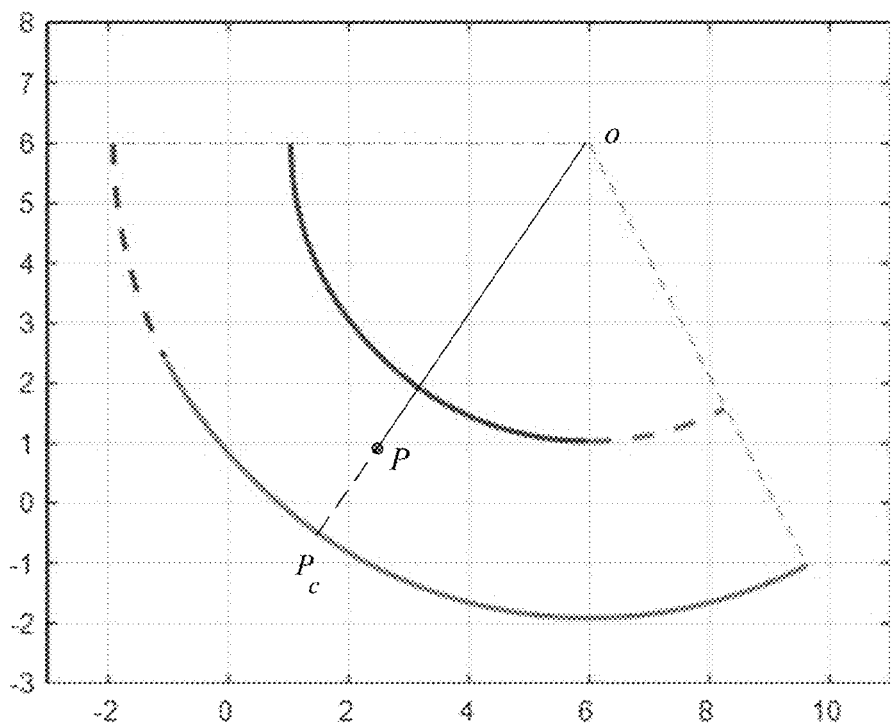
FIG. 11 is a schematic diagram for determining whether the point is within a sector range.

For step S3012, as shown in FIG. 11, specific implementation steps are as follows:

determining whether the intersection point $P_c$ between a reverse extension line of the line connecting the end point A (B) of the obstacle line segment with the center O and the second circle is on the outside circular arc segment $P_{se} E_{v4}$ of the sector ring (the radius corresponding to this circular arc segment is R2). If it is yes, it means that the end point A (B) of the obstacle line segment is within the range of the fifth central angle θ; otherwise, the ending point A (B) of the obstacle line segment is outside the range of the fifth central angle θ.

S302, When it is determined that the obstacle line segment is located in the circular ring segment of the circular arc path, determining whether both ends A and B of the obstacle line segment are all located in the range of a first region S1 or S2. If yes, it means that the obstacle line segment is not located in the circular arc path contour; otherwise, it means that the obstacle line segment is located in the circular arc path contour. Where the first region refers to a region that is within the circular ring segment of the circular arc path and does not belong to a region where the path interferes with the vehicle contour.

Figure 12:
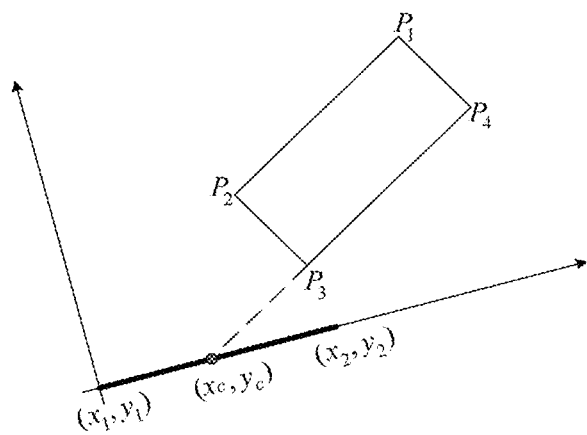
FIG. 12 is a schematic diagram for determining whether the line segment intersects with a vehicle contour.

④ Determining whether the obstacle line segment intersects with the end point vehicle contour, as shown in FIG. 12.

S401, taking a straight line where the obstacle line segment AB is located as a X axis, and one end of the obstacle line segment, such as A (x1, y1), as a coordinate origin, to establish a plane rectangular coordinate system;

S402, Converting four corner points of the end point vehicle contour to be in the plane rectangular coordinate system, so as to obtain coordinates of four corners of the end point vehicle contour in the plane rectangular coordinate system;

S403, Using the obtained coordinates of the corners to determine whether there is an intersection point between edges of the end point vehicle contour and the X axis;

S404, When it is determined that there is an intersection point between the end point vehicle contour and the X axis, determining whether X-coordinate of the intersection point meets an intersection determination criterion. If it is yes, it means that the obstacle line segment intersects with the end point vehicle contour; otherwise, it means that the obstacle line segment does not intersect with the end point vehicle contour.

For step S403, it specifically includes the following sub-steps:

determining any one of the edges of the end point vehicle contour as follows:

when a product of components y (i.e. values of coordinates y) of two end points of an edge is greater than 0, it means that the edge does not intersect with the X axis, that is, the edge does not intersect with the obstacle line segment;

when the product of the components y (i.e. values of coordinates y) of the two end points of the edge is equal to 0, it means that the two end points of the edge are two intersection points between the edge and the X axis; and when the product of the components y (i.e. values of coordinates y) of the two end points of the edge is less than 0, it means that there is one intersection point between the edge and the X axis.

For step S404, it specifically includes the following sub-steps:

when a X coordinate of an intersection point $(x_c, y_c)$ between any one of the edges of the end point vehicle contour and the X axis conforms to the intersection determination criterion, with the intersection determination criterion being $x_c \geq 0$ and $x_c \leq dis\_obs$, that is, when $x_c \geq 0$ and $x_c \leq dis\_obs$ are determined, it means that the obstacle line segment intersects with the rectangular contour of the end point vehicle contour. where dis_obs represents a length of the obstacle line segment.

Figure 13:
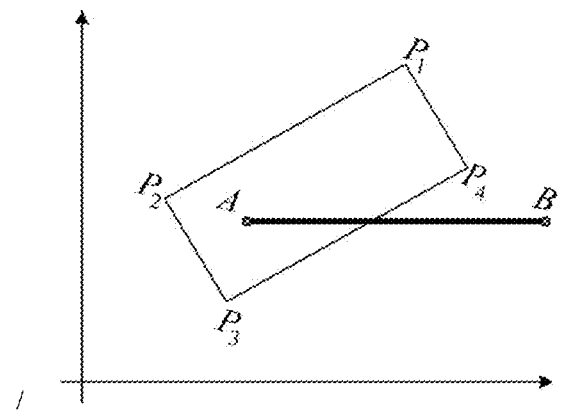
FIG. 13 is a schematic diagram for determining whether the line segment is located in the vehicle contour.

⑤ Determining whether the obstacle line segment is located in the end point vehicle contour, as shown in FIG. 13.

S501, By using directed line segments formed by the end point A (B) of the obstacle line segment and the corner points of the end point vehicle contour, determining whether both end points of the obstacle line segment are all located in the end point vehicle contour; if yes, it means that the obstacle line segment is located in the end point vehicle contour; otherwise, it means that the obstacle line segment is not located in the end point vehicle contour.

For the above step S501, it includes the following sub-steps:

For one end point of the obstacle line segment, perform the following calculations:

calculate a vector product (as a seventh vector product) of two vectors $\overrightarrow{P_1P_2}$ and $\overrightarrow{P_1A}$, i.e. calculate $[X_7, Y_7, Z_7]=\overrightarrow{P_1P_2}\times\overrightarrow{P_1A}$;

calculate a vector product (as an eighth vector product) of two vectors $\overrightarrow{P_2P_3}$ and $\overrightarrow{P_2A}$, i.e. calculate $[X_8, Y_8, Z_8]=\overrightarrow{P_2P_3}\times\overrightarrow{P_2A}$;

calculate a vector product (as the ninth vector product) of two vectors $\overrightarrow{P_3P_4}$ and $\overrightarrow{P_3A}$, i.e. calculate $[X_9, Y_9, Z_9]=\overrightarrow{P_3P_4}\times\overrightarrow{P_3A}$;

calculate a vector product (as the tenth vector product) of two vectors $\overrightarrow{P_4P_1}$ and $\overrightarrow{P_4A}$, i.e. calculate $[X_{10}, Y_{10}, Z_{10}]=\overrightarrow{P_4P_1}\times\overrightarrow{P_4A}$;

when components Z of the above vector products are all greater than or equal to 0, i.e., $Z_7 \geq 0$, $Z_8 \geq 0$, $Z_9 \geq 0$ and $Z_{10} \geq 0$, then, it can be determined that the end point A of the obstacle line segment is within the end point vehicle contour;

in the same way, the above calculation and determination can be made on the other end point B of the obstacle line segment (i.e., replace the above end point A with the end point B), so as to determine whether the other end point B of the obstacle line segment is within the end point vehicle contour;

when it is determined that both end points A and B of the obstacle line segment are located in the end point vehicle contour, it means that the obstacle line segment is located in the end point vehicle contour; otherwise, the obstacle line segment is not located in the end point vehicle contour.

where $P_1$, $P_2$, $P_3$ and $P_4$ are the upper left corner point, lower left corner point, lower right corner point and upper right corner point of the end point vehicle contour, respectively.

According to the determination results of the above steps ① to ⑤, it can be determined whether the obstacle collides with the path, specifically:

when it is determined that the obstacle meets the obvious non-collision condition, it means that the obstacle does not collide with the path, flag_cross=0;

when it is determined that the obstacle line segment intersects with the circular arc path contour, it means that the obstacle collides with the path, flag_cross=1;

when it is determined that the obstacle line segment is located in the circular arc path contour, it means that the obstacle collides with the path, flag_cross=1;

when it is determined that the obstacle line segment intersects with the end point vehicle contour, it means that the obstacle collides with the path, flag_cross=1;

when it is determined that the obstacle line segment is located in the end point vehicle contour, it means that the obstacle collides with the path, flag_cross=1; and when it is determined that the obstacle line segment does not intersect with the circular arc path contour, the obstacle line segment is not located in the circular arc path contour, the obstacle line segment does not intersect with the end point vehicle contour, and the obstacle line segment is not located in the end point vehicle contour, it means that the obstacle does not collide with the path, flag_cross=0.

II. Obstacle Collision Detection in Straight Line Path

Figure 14:
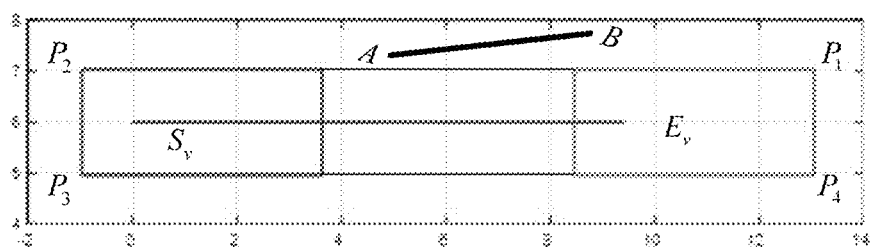
FIG. 14 is a parameter schematic diagram of obstacle collision detection in a straight path.

For the obstacle collision detection in the straight line path, as shown in FIG. 14, the vehicle traveling contour is simplified as a rectangle $P_1P_2P_3P_4$, that is, the straight line path contour, and then the collision determination is performed according to the interference determination method between the obstacle line segment and the rectangular contour, so as to realize the collision detection.

It can be seen that for the step of geometrically performing an obstacle collision detection in a straight line path includes the following sub-steps:

determining whether the obstacle line segment intersects with the straight line path contour;

determining whether the obstacle line segment is located in the straight line path contour;

determining whether the obstacle line segment intersects with the end point vehicle contour;

determining whether the obstacle line segment is located in the end point vehicle contour; and determining whether the obstacle collides with the path according to a determined result, specifically:

when it is determined that the obstacle line segment intersects with the straight line path contour, it means that the obstacle collides with the path, flag_cross=1;

when it is determined that the obstacle line segment is located in the straight line path contour, it means that the obstacle collides with the path, flag_cross=1;

when it is determined that the obstacle line segment intersects with the end point vehicle contour, it means that the obstacle collides with the path, flag_cross=1;

when it is determined that the obstacle line segment is located in the end point vehicle contour, it means that the obstacle collides with the path, flag_cross=1; and when it is determined that the obstacle line segment does not intersect with the straight line path contour, the obstacle line segment is not located in the straight line path contour, the obstacle line segment does not intersect with the end point vehicle contour, and the obstacle line segment is not located in the end point vehicle contour, it means that the obstacle does not collide with the path, flag_cross=0.

Figure 15:
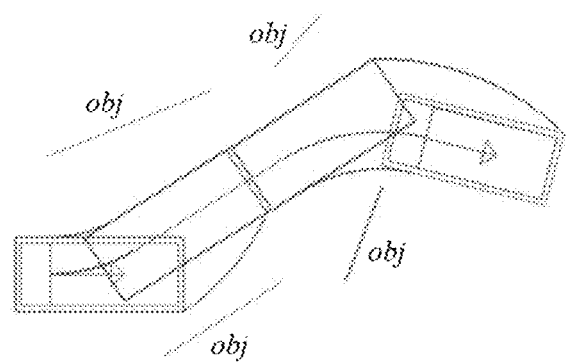
FIG. 15 is a schematic diagram of an obstacle path distribution.

At this time, adopting the detecting process of the present application, a path obstacle collision detection determination can be achieved, and the operation efficiency of its algorithm is significantly higher than that of a discrete sequence point collision detection algorithm, which plays a crucial role in saving operation resources and realizing real-time dynamic planning. As shown in Table 1, the efficiency of the method of the present application is compared with that of a discrete point traversal collision detection method (a statistical result of continuous determination of 10000 times, the hardware platform is PC, the main frequency of CPU of the PC is 2.5 GHz, the memory is 16 GB, and the software platform is labview). It can be seen that under the same scene, the operation efficiency of the method of the present application is significantly higher than the discrete point traversal collision detection method. FIG. 15 is a schematic diagram of a path distribution of obstacles.

TABLE 1

| Serial number | Number of obstacles | Consumed time by the present application method $t_1$ (ms) | Consumed time by traversal method $t_2$ (ms) | Consumed time ratio ($t_2/t_1$) |
| --- | --- | --- | --- | --- |
| 1 | 5 | 189 | 1904 | 10.07 |
| 2 | 10 | 348 | 3275 | 9.41 |
| 3 | 15 | 480 | 4691 | 9.77 |
| 4 | 20 | 611 | 6140 | 10.04 |
| 5 | 25 | 819 | 7691 | 9.39 |
| 6 | 30 | 1053 | 9177 | 8.71 |

From the above, the advantages of the present application include:

From the above, the advantages possessed by this application include:

1. Use a line segment to express an obstacle, and a straight line and a circular arc to express a path, which can facilitate storage and calculation and construction of a mathematical model;

2. Adopt a layered determination process to perform an obstacle collision detection in the path, which can significantly improve the operation efficiency;

3. Using the circular arc and a rectangle to build a boundary contour of the traveling of a vehicle, which can avoid a discrete traversal, and significantly improve the operation efficiency;

4. Abstract and simplify the path obstacle collision problem into an interference problem between the arc, the rectangle and the line segment, the mathematical solution of which is very convenient and has a high accuracy;

5. Use a vector relationship to determine whether the point is on the line segment, whether the point is on the circular arc segment, whether the point is within an included angle range, and whether the point is within the rectangular contour, which determination method is more concise.

The above is a detailed description of preferred embodiments of the present application, but the present application is not limited to the embodiments. Those skilled in the art can make various equivalent deformations or replacements without departing from the spirit of the present application, and these equivalent deformations or replacements are included in the scope of claims of the present application.

What is claimed is:

1. A method for detecting obstacle collision in an automatic parking path, comprising the following steps:

geometrically performing at least one of: an obstacle collision detection in a circular arc path and an obstacle collision detection in a straight line path by using a path contour, a vehicle contour and an obstacle contour;

wherein the path contour is a boundary contour formed by a vehicle traveling from a start point pose to an end point pose along a path, the path contour comprises at least one of: a circular arc path contour and a straight line path contour, the vehicle contour is a polygon, and the obstacle contour of an obstacle is a line segment;

wherein the step of geometrically performing an obstacle collision detection in a circular arc path comprises the following sub-steps:

determining whether the obstacle meets an obvious non-collision condition;

determining whether the line segment intersects with the circular arc path contour;

determining whether the line segment is located in the circular arc path contour;

determining whether the line segment intersects with an end point vehicle contour, wherein the end point vehicle contour refers to a vehicle contour at the end point pose;

determining whether the line segment is located in the end point vehicle contour; and according to a determined result, determining whether the obstacle collides with the path;

when the obstacle does not collide with the path, controlling the vehicle to follow the path and park the end point pose.

2. The method for detecting obstacle collision in an automatic parking path according to claim 1, wherein the obvious non-collision condition comprises any one of the followings:

distances between both end points of the line segment and a center of a circle corresponding to the circular arc path contour are all less than a first radius, the first radius being a radius corresponding to an inside circular arc segment in the circular arc path contour;

a minimum distance from the center of the circle corresponding to the circular arc path contour to the line segment is greater than a second radius, the second radius being a radius corresponding to an outside circular arc segment in the circular arc path contour; or both end points of the line segment are within a range of a fourth central angle, the fourth central angle being a group angle of a central angle corresponding to a planned path.

3. The method for detecting obstacle collision in an automatic parking path according to 1, wherein the step of determining whether the line segment intersects with the circular arc path contour comprises the following sub-steps:

combining a straight line equation and a circle equation to get a single-variable quadratic equation, wherein the straight line equation refers to an equation of a straight line where the line segment is located, the circle equation comprises an equation of a first circle where the inside circular arc segment in the circular arc path contour is located and an equation of a second circle where the outside circular arc segment in the circular arc path contour is located;

determining whether the single-variable quadratic equation has a real root solution, and when the single-variable quadratic equation has the real root solution, meaning there is an intersection point between the straight line and circles; otherwise, meaning there is no intersection point between the straight line and the circles; and when it is determined that there is an intersection point between the straight line and the circles, determining whether the intersection point is on the line segment and the inside or outside circular arc segment of the path contour, and when the intersection point is on the line segment and the inside or outside circular arc segment of the path contour, meaning that the line segment intersects with the circular arc path contour; otherwise, meaning that the line segment does not intersect with the circular arc path contour.

4. The method for detecting obstacle collision in an automatic parking path according to claim 2, wherein the step of determining whether the line segment is located in the circular arc path contour comprises the following sub-steps:

determining whether the line segment is located in a circular ring segment of the circular arc path; and when it is determined that the line segment is located in the circular ring segment of the circular arc path, determining whether both end points of the line segment are all located in a first region, and when the both end points of the line segment are all located in the first region, meaning that the line segment is not located in the circular arc path contour; otherwise, meaning that the line segment is located in the circular arc path contour;

wherein the first region refers to a region that is within the circular ring segment of the circular arc path and does not belong to a region where the path interferes with the vehicle contour.

5. The method for detecting obstacle collision in an automatic parking path according to claim 4, wherein the step of determining whether the line segment is located in a circular ring segment of the circular arc path comprises the following sub-steps:

determining whether the distances between both end points of the line segment and the center of the circle corresponding to the circular arc path contour are all greater than the first radius and less than the second radius, and when the distances between both end points of the line segment and the center of the circle corresponding to the circular arc path contour are all greater than the first radius and less than the second radius, performing a next step; otherwise, meaning that the line segment is not located in the circular ring segment of the circular arc path; and determining whether both end points of the line segment are all within a range of a fifth central angle, and when the both end points of the line segment are all within the range of the fifth central angle, performing a next step; otherwise, meaning that the line segment is not within the circular ring segment of the circular arc path.

6. The method for detecting obstacle collision in an automatic parking path according to claim 1, wherein the step of determining whether the line segment intersects with an end point vehicle contour comprises the following sub-steps:

taking a straight line where the line segment is located as X axis, and one end of the line segment as a coordinate origin, to establish a plane rectangular coordinate system;

converting the end point vehicle contour to be in the plane rectangular coordinate system, so as to obtain a coordinate of an angle of the end point vehicle contour in the plane rectangular coordinate system;

determining whether there is an intersection point between edges of the end point vehicle contour and the X axis by using the obtained coordinate of the angle; and when it is determined that there is an intersection point between the end point vehicle contour and the X axis, determining whether X-coordinate of the intersection point conforms to an intersection determination criterion, and when the X-coordinate of the intersection point conforms to an intersection determination criterion, meaning that the line segment intersects with the end point vehicle contour; otherwise, meaning that the line segment does not intersect with the end point vehicle contour.

7. The method for detecting obstacle collision in an automatic parking path according to claim 1, wherein the step of determining whether the line segment is located in the end point vehicle contour comprises the following sub-steps:

by using directed line segments formed by both end points of the line segment and corner points of the end point vehicle contour, determining whether both end points of the line segment are all located in the end point vehicle contour, and when the both end points of the line segment are all located in the end point vehicle contour, meaning that the line segment is located in the end point vehicle contour; otherwise, meaning that the line segment is not located in the end point vehicle contour.

8. An apparatus for detecting obstacle collision in an automatic parking path, comprising:
- a memory for storing various programs;
- a processor for loading the programs and performing the following steps:
- geometrically performing at least one of: an obstacle collision detection in a circular arc path and an obstacle collision detection in a straight line path by using a path contour, a vehicle contour and an obstacle contour;
- wherein the path contour is a boundary contour formed by a vehicle traveling from a start point pose to an end point pose along a path, the path contour comprises at least one of: a circular arc path contour and a straight line path contour, the vehicle contour is a polygon, and the obstacle contour of an obstacle is a line segment;
- wherein the geometrically performing an obstacle collision detection in a circular arc path comprises:
- determining whether the obstacle meets an obvious non-collision condition;
- determining whether the line segment intersects with the circular arc path contour;
- determining whether the line segment is located in the circular arc path contour;
- determining whether the line segment intersects with an end point vehicle contour, wherein the end point vehicle contour refers to a vehicle contour at the end point pose;
- determining whether the line segment is located in the end point vehicle contour; and
- according to a determined result, determining whether the obstacle collides with the path;
- the processor for further performing the following:
- when the obstacle does not collide with the path, controlling the vehicle to follow the path and park to the end point pose.

\* \* \* \* \*